UNITED STATES PATENT OFFICE.

FRANZ DAMHORST, AUGUST KEMPER, AND ERNST UTKE, OF BERLIN, GERMANY.

PROCESS FOR APPLYING POWDER TO PATTERNS.

No. 815,297.  Specification of Letters Patent.  Patented March 13, 1906.

Application filed June 29, 1905. Serial No. 267,619.

*To all whom it may concern:*

Be it known that we, FRANZ DAMHORST, manufacturer, AUGUST KEMPER, manufacturer, and ERNST UTKE, molder, subjects of the German Emperor, residing at Berlin, in the Empire of Germany, have invented new and useful Improvements in Processes for Applying Powder to Patterns, of which the following is a specification.

The present invention relates to a process for applying to patterns pattern-powder of the nature hereinafter described.

The present process is intended principally for such powders for patterns as consist of mineral materials—for example, calcium carbid or quicklime or mixtures of well-known dusting materials with such mineral substances. Such powders for patterns as calcium carbid and quicklime have hitherto been dusted onto the pattern in a fine pulverized dry condition, in which case naturally the powder cannot be prevented from flying about in the air to a very considerable extent. This dust constantly inhaled by the molder during the operation of powdering is injurious to the health on account of the nature of the powder, so that even with regard to this point such a dusting process must be held to be unsuitable for use in practice. According to the present process the pattern-powder, particularly calcium carbid or quicklime or a mixture of well-known dusting materials with calcium carbid or quicklime, in a fine powdered condition, is incorporated in a chemically-indifferent fluid—for example, petroleum—producing a fluid mixture, and this mixture is applied to the pattern by means of a sprayer in the form of a fine drizzle. The proportions of the mixture are so selected that the liquid is thin enough to be capable of being applied to the pattern by means of a sprayer in the form of fine drizzle.

In the case of this process the flying about of the pattern-powder in the form of dust is out of the question, so that the present invention offers in the first place an important advantage as regards health; but for the purity of the casting—that is, for obtaining smooth surfaces on the casting—the process is of great importance on account of the fact that the particles of fluid applied to the pattern adhere better than the pattern-powder applied in a dry state, a point which is particularly favorably noticeable in the case of patterns with fairly large vertical surfaces.

The action of the carbid powder or lime powder is in the case of their application to the present invention exactly the same as in the case of their application in the dry condition—that is, a separate layer of gas or steam between the pattern and mold is generated on their coming into contact with the moist water contained in the molding-sand. The patterns provided with the coating are embedded in the mold in the ordinary manner. As the carbid powder or lime powder settles to the bottom if the liquid stands a fairly long time the same is to be energetically stirred before use. The process has the additional advantage that no special devices for storing carbid powder or lime powder are requisite, as the powder is completely protected by the petroleum from the influence of the air or the like.

What we claim as our invention, and desire to secure by Letters Patent, is—

1. The herein-described improvement in the art of treating patterns which consists in mixing with a suitable anhydrous liquid a powder capable of generating a gas on contact with water and spraying the mixture on the patterns, substantially as described.

2. The herein-described improvement in the art of treating patterns which consists in mixing with petroleum a powder capable of generating a gas on contact with water, and spraying the mixture on the patterns, substantially as described.

In testimony whereof we have signed our names to this specification in the presence of two subscribing witnesses.

FRANZ DAMHORST.
AUGUST KEMPER.
ERNST UTKE.

Witnesses:
 HENRY HASPER,
 WOLDEMAR HAUPT.